(12) United States Patent
Tae et al.

(10) Patent No.: US 12,051,187 B2
(45) Date of Patent: Jul. 30, 2024

(54) AI-BASED NEW LEARNING MODEL GENERATION SYSTEM FOR VISION INSPECTION ON PRODUCT PRODUCTION LINE

(71) Applicant: LG ELECTRONICS INC., Seoul (KR)

(72) Inventors: Kyong Pil Tae, Seoul (KR); Young Wook Kim, Seoul (KR); Chang Yong Park, Seoul (KR); Bong Su Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 413 days.

(21) Appl. No.: 17/618,235

(22) PCT Filed: Aug. 19, 2019

(86) PCT No.: PCT/KR2019/010501
§ 371 (c)(1),
(2) Date: Dec. 10, 2021

(87) PCT Pub. No.: WO2021/033791
PCT Pub. Date: Feb. 25, 2021

(65) Prior Publication Data
US 2022/0222807 A1 Jul. 14, 2022

(51) Int. Cl.
*G06T 7/00* (2017.01)
*G05B 19/418* (2006.01)
*G06V 10/77* (2022.01)

(52) U.S. Cl.
CPC ........ *G06T 7/0004* (2013.01); *G05B 19/4183* (2013.01); *G06V 10/7715* (2022.01);
(Continued)

(58) Field of Classification Search
CPC ......... G06T 7/0004; G06T 2207/20081; G06T 2207/30108; G06T 7/00; G05B 19/4183;
(Continued)

(56) References Cited

U.S. PATENT DOCUMENTS

| 2010/0010943 A1* | 1/2010 | Ito ........................... G06N 3/08 706/54 |
| 2012/0263376 A1* | 10/2012 | Wang ................... G06V 10/774 382/160 |
| 2019/0156474 A1* | 5/2019 | Watanabe ............... G06T 7/001 |

FOREIGN PATENT DOCUMENTS

| JP | 2006-252333 A | 9/2006 |
| JP | 2013-20290 A | 1/2013 |

(Continued)

OTHER PUBLICATIONS

Han et al., "A new image classification method using CNN transfer learning and web data augmentation", Expert Systems with Applications, vol. 95, 2018 (Available online Nov. 13, 2017), pp. 43-56.

*Primary Examiner* — Siamak Harandi
(74) *Attorney, Agent, or Firm* — Birch, Stewart, Kolasch & Birch, LLP

(57) ABSTRACT

An AI-based new learning model generation system for vision inspection on a product production line is proposed. In the AI-based new learning model generation system, the candidate set extraction module extracts two or more candidate data sets on the basis of determination type information from among a plurality of training data sets that have been applied to learning of existing learning models previously generated for the vision inspection on the product production line. In addition, an additional set determination module calculates similarity between training images of new training data and a candidate data set, and determines any one greater than or equal to a reference value as an additional training data. In addition, the new model generation
(Continued)

module may generate a new learning model by training the additional training data set and the new training data as a pre-training model.

15 Claims, 11 Drawing Sheets

(52) U.S. Cl.
CPC ............... *G06T 2207/20081* (2013.01); *G06T 2207/30108* (2013.01)

(58) Field of Classification Search
CPC ...... G05B 2219/40577; G05B 13/0265; G05B 19/418; G05B 23/02; G06V 10/7715; G06V 2201/06; G06V 10/774; G06V 10/778; G06F 18/214; G06F 18/217; G06N 3/08; G06N 5/01; G06N 20/00; Y02P 90/02

See application file for complete search history.

(56) References Cited

FOREIGN PATENT DOCUMENTS

| | | |
|---|---|---|
| JP | 2019-95217 A | 6/2019 |
| JP | 2019-101959 A | 6/2019 |
| KR | 10-2019-0088376 A | 7/2019 |

\* cited by examiner

AI-BASED NEW LEARNING MODEL GENERATION SYSTEM FOR VISION INSPECTION ON PRODUCT PRODUCTION LINE

CROSS REFERENCE TO RELATED APPLICATIONS

This application is the National Phase of PCT/KR2019/010501 filed on Aug. 19, 2019, which is hereby expressly incorporated by reference into the present application.

TECHNICAL FIELD

The present disclosure relates to an AI-based new learning model generation system for vision inspection on a product production line and, more particularly, to an AI-based new learning model generation system for vision inspection on a product production line, wherein a training data set applied to generate a previously registered existing learning model is used to generate a new learning model.

BACKGROUND ART

Deep learning technology, one of artificial intelligence (AI) technologies, refers to an artificial neural network-based machine learning method that allows machines to learn by simulating human biological neurons. Recently, deep learning technology has been receiving great attention as contributing to the development of image recognition, speech recognition, and natural language processing.

Such deep learning technology has recently been applied to vision inspection in product production lines. As an example, Korean Patent Application Publication No. 10-2019-0063839 disclosed a "METHOD AND SYSTEM FOR MACHINE VISION BASED QUALITY INSPECTION USING DEEP LEARNING IN MANUFACTURING PROCESS".

The above-described technology disclosed in the Korean Patent Application Publication generates product images for learning, trains a classifier for classifying good and defective products with the generated product images for learning, and uses the trained classifier to determine a product as good or defective.

As with the technology disclosed in the above-described Korean Patent Application Publication, in deep learning technology, image data of good and defective products and label information that records whether the corresponding image is a defective product image or a good product image are input to a learning model, such as the classifier, and then learned, so as to generate a new learning model for inspection of good and defective product.

In general, various types of inspections of defective products are performed on product production lines. A product production line for manufacturing one product includes numerous processes such as an injection process, a plate process, a sub-assembly process, and a total-assembly process, and vision inspection is performed on a result of each process, for example, parts manufactured through injection or plate molding, sub-parts manufactured through a part-assembly process, and products manufactured through a total-assembly process.

FIG. 1 is a view schematically showing an example of a general product production line.

Referring to FIG. 1 to describe, a product production line may include an injection process, a plate process, a sub-assembly process, and a total-assembly process. An injection process and a plate process manufacture parts necessary for product production in the injection method or plate method, and one product production line may include a multiple injection processes or plate processes.

For parts manufactured through an injection process or a plate process, there are various types of defects, for example, defects of dents, cracks, scratches, and the like, and processes of dent inspection, crack inspection, and scratch inspection may be included for inspecting such defects.

The sub-assembly process is a process for producing sub-parts by assembling parts, and the sub-parts may also undergo dent inspection, crack inspection, and scratch inspection, as shown in FIG. 1, and may also include inspection process of assembly defects such as missing parts or misalignment.

Total-assembly process is a process of manufacturing a product by assembling sub-parts, and an appearance inspection process for defects, such as foreign matter adhesion defects and assembly defects, is performed. In the total-assembly process, dent inspection, crack inspection, and scratch inspection may be performed.

Meanwhile, since a resulting output is different depending on each process, a form of an image to be used as training data may be different, a type of defects may be different depending on the resulting output even with the same defect type, and the resulting output itself revealing the defect may be different so that the form of the image is different as a result, whereby, theoretically, each learning model should be generated and applied according to the resulting output of each process and the type of defects.

In addition, in a case of a manufacturer producing various product lines, a product production line for each product is different, and even when the same injection process is present, a result is also different for each product, so a separate learning model should be generated for each product. Similarly, when a product production line is changed to produce a new product, a new learning model appropriate for each process and defect types of the new product production line should be generated.

Here, determination accuracy of a new learning model may be determined by various factors, wherein the amount of training data, selection of hyper-parameters set at the beginning of learning, selection of a model for pre-training (hereinafter referred to as the pre-training model), and the like are important factors in determining the determination accuracy.

However, in the case of a new learning model to be applied to a new product production line, the amount of training data, especially the amount of defective data, is relatively small, and the determination accuracy of the new learning model that is trained and generated with the small amount of training data is inevitably low.

DISCLOSURE

Technical Problem

An objective of the present disclosure is to provide an AI-based new learning model generation system for vision inspection on a product production line, wherein, by using a training data set used to generate a previously registered existing learning model in generation of a new learning model, the AI-based new learning model generation system may increase determination accuracy when generating the new learning model having a small amount of training data.

Another objective of the present disclosure is to determine an existing training data set, to be added for generation of a new learning model, on the basis of similarity between training images, so as to extract a training data set close to the training images constituting new training data among the existing training data set to be added.

Yet another objective of the present disclosure is to increase similarity by using feature maps and feature point distribution in similarity determination so that determination accuracy is to be increased when generating a new learning model.

Still another objective of the present disclosure is to determine a pre-training model, to be applied to both generation of a new learning model and determination of additional training data set, as an optimal learning model among pre-registered existing learning models, so as to increase determination accuracy of the new learning model.

Still another objective of the present disclosure is to recommend an optimal pre-training model while reducing time required for determining a pre-training model and increasing efficiency of a determination process.

Technical Solution

In an AI-based new learning model generation system for vision inspection on a product production line according to the present invention, among a plurality of training data sets that have been applied to learning of existing learning models previously generated for the vision inspection on the product production line, a candidate set extraction module may extract two or more candidate data sets on the basis of determination type information, and an additional set determination module may calculate similarity between training images of new training data and the candidate data sets, so as to determine any one training data greater than or equal to a reference value as additional training data. In addition, a new model generation module may generate a new learning model by training an additional training data set and the new training data by using a pre-training model.

The determination type information may include at least one piece of information among defect type information on a type of defects, product type information on a type of products to be inspected, and part type information on a type of parts to be inspected, and each of the training data sets stored in the data storage may include model information having at least one piece of information among the defect type information, the product type information, and the part type information. In this case, the candidate set extraction module may extract the candidate data sets with reference to the model information.

The candidate set extraction module may extract a preset number of training data sets as the candidate data sets according to a priority set in an order of the defect type information, the part type information, and the product type information.

The additional set determination module may calculate feature point distribution by generating feature maps for the new training data and calculate feature point distribution by generating feature maps for the candidate data sets so that a difference between the feature point distributions may be calculated as similarity.

The AI-based new learning model generation system according to the present invention may further include: a learning model storage in which a plurality of existing learning models is stored; a candidate model extraction module configured to extract two or more candidate models on the basis of the determination type information; and a model determination module configured to calculate determination accuracy by applying the new training data to two or more candidate models and determine, as the pre-trained model, an uppermost candidate model having determination accuracy greater than or equal to a predetermined first reference value.

The model determination module may extract feature point distribution of feature maps generated for the new training data in a determination process of the uppermost candidate model and a similar candidate model when there is the similar candidate model whose determination accuracy difference from the uppermost candidate model is within a preset similarity range, and determine any one candidate model whose feature point distribution difference is large as the pre-training model.

The model determination module may determine the pre-training model by using an average value of the feature point distribution difference between a preset amount of defective training data and the normal training data, which are arbitrarily selected from among the plurality of training data applied to the determination process of the uppermost candidate model and the similar candidate model.

The model determination module may extract upper-level n candidate models, based on the determination accuracy, as re-examination candidate models when the determination accuracy is less than or equal to the first reference value, train each of the re-examination candidate models with a preset amount of training data among the plurality of training data, input the preset amount of training data among the plurality of the training data into the trained re-examination candidate models to determine whether the training data is good or not, and determine, as the pre-training model, an uppermost re-examination candidate model in which the determination accuracy of each re-examination candidate model is greater than or equal to a preset second reference value.

When extracting the re-examination candidate models, the model determination module may remove the candidate models, whose determination accuracy is less than or equal to a preset lower limit, from the re-examination candidate models.

The model determination module may extract feature point distribution of the feature maps generated for each of the training data in the determination process of the uppermost re-examination candidate model and a similar re-examination candidate model when there is the similar re-examination candidate model whose determination accuracy difference from the uppermost re-examination candidate model among the plurality of re-examination candidate models is within a preset similarity range, and determine, as the pre-training model, any one candidate model whose feature point distribution difference between defective training data and normal training data is large among the uppermost re-examination candidate model and the similar re-examination candidate model.

The model determination module may calculate an average value of the feature point distribution difference between the normal training data and a preset amount of defective training data, and determine, as the pre-training model, any one candidate model having a larger average value among the uppermost re-examination candidate model and the similar retest candidate model.

The feature point distribution difference may be calculated through the KL-Divergence algorithm.

Advantageous Effects

The AI-based new learning model generation system for vision inspection on a product production line according to the present disclosure has one or more of the following effects.

First, a training data set used to generate a previously registered existing learning model is used to generate a new learning model so that a large amount of training data may be secured even when the new learning model having a small amount of training data is generated, thereby increasing determination accuracy of the newly generated new learning model.

Second, there is an effect that determination of additional training data set among existing training data sets is determined on the basis of similarity between training images, whereby the additional training data set to be added to generation of a new learning model may be determined by the image most similar to the new training data.

Third, there is an effect that in determining similarity between training data, the similarity is calculated by using feature maps and feature point distribution calculated through a pre-training model so that the similarity of new training data may be increased, thereby significantly increasing determination accuracy when generating a new learning model.

Fourth, there is provided an effect that a candidate data set is extracted by using determination type information including any one piece of information among defect type information, product type information, and part type information, whereby a training data set having high similarity to new training data may be extracted as the candidate data set.

Fifth, a pre-training model to be applied to both generation of a new learning model and determination of additional training data set may be determined as an optimal learning model among previously registered existing learning models, thereby increasing determination accuracy of the new learning model.

Sixth, there is provided an effect that in determining a pre-training model, a candidate model for determining the pre-training model is extracted by using determination type information including any one piece of information among defect type information, product type information, and part type information, thereby extracting a learning model having similarity to a new learning model as the candidate model.

Seventh, there is provided an effect that in determining a pre-training model, a candidate model determines only a part of new training data, and determines a pre-training model on the basis of determination accuracy, thereby recommending an optimal pre-training model while reducing time required for determining the pre-training model.

Eighth, there is provided an effect that in determining a pre-training model, when determination accuracy of all candidate models is less than or equal to a first reference value, upper-level n candidate models are extracted as re-examination candidate models, the re-examination candidate models are trained with a part of training data, and then a pre-training model is determined, thereby recommending an optimal pre-training model while increasing efficiency of a determination process of the pre-training model.

Ninth, there is provided an effect that in determining a pre-training model, when determination accuracy is within a similarity range, an additional evaluation process is performed by using feature point distribution, whereby an optimal pre-training model may be recommended.

BEST MODE

Figure 1:
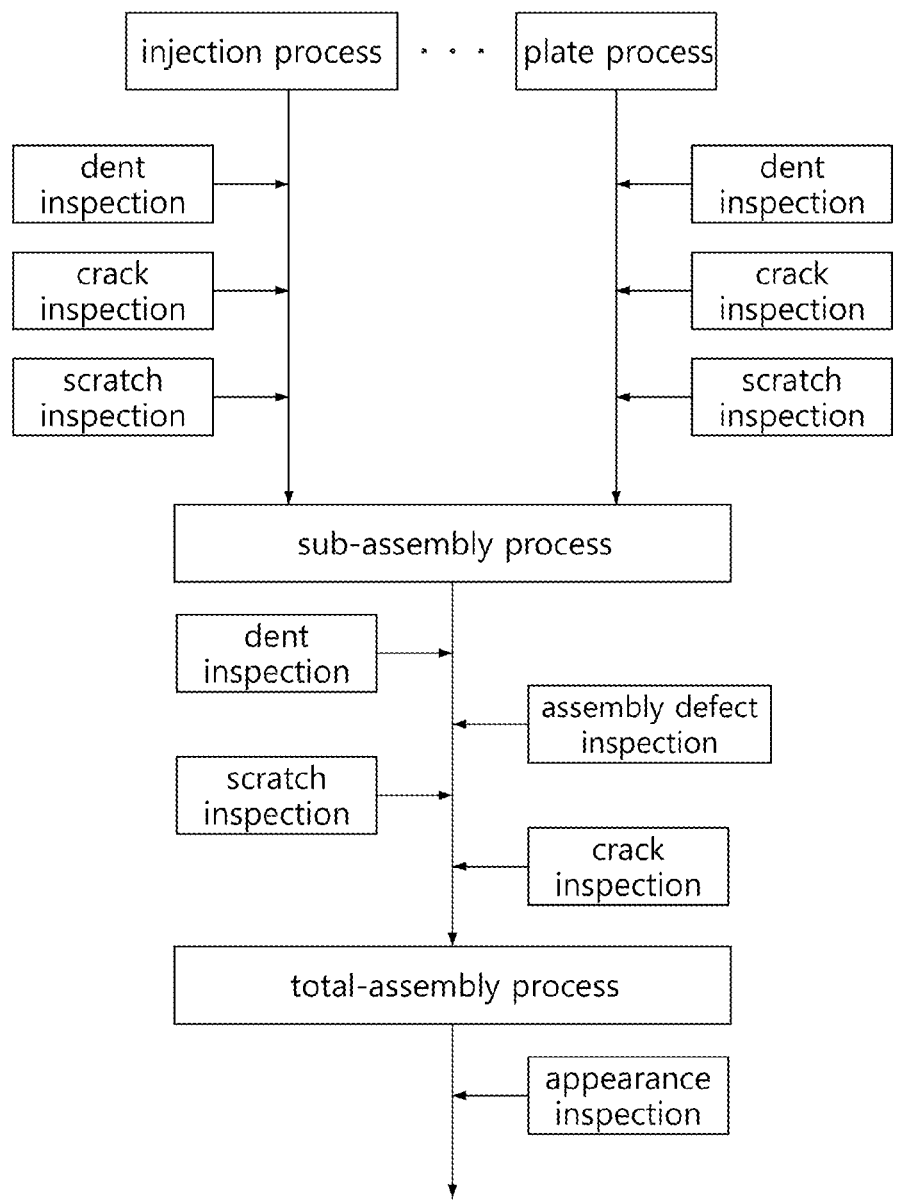
FIG. 1 is a view schematically showing an example of a general product production line.

An AI-based new learning model generation system for vision inspection on a product production line according to the present disclosure includes: a data storage in which a plurality of training data sets and a plurality of new training data collected for generation of a new learning model are stored, wherein each of the training data sets is applied to learning of an existing learning model previously generated for vision inspection on the product production line; a candidate set extraction module configured to extract at least two or more candidate data sets from among the plurality of training data sets on the basis of determination type information when the determination type information for generating the new learning model is input; an additional set determination module configured to calculate similarity between a new training image included in the new training data and a candidate training image included in the candidate data sets and determine, as an additional training data set, one candidate data set having the similarity greater than or equal to a pre-registered reference value; and a new model generation module configured to generate the new learning model by applying the additional training data set determined by the additional set determination module and the new training data to a pre-training model.

MODE FOR INVENTION

Advantages and features of the present disclosure and the methods of achieving the same will become apparent with reference to an exemplary embodiment described below in detail in conjunction with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

Hereinafter, an exemplary embodiment of the present disclosure will be described in detail with reference to the accompanying drawings.

Figure 2:
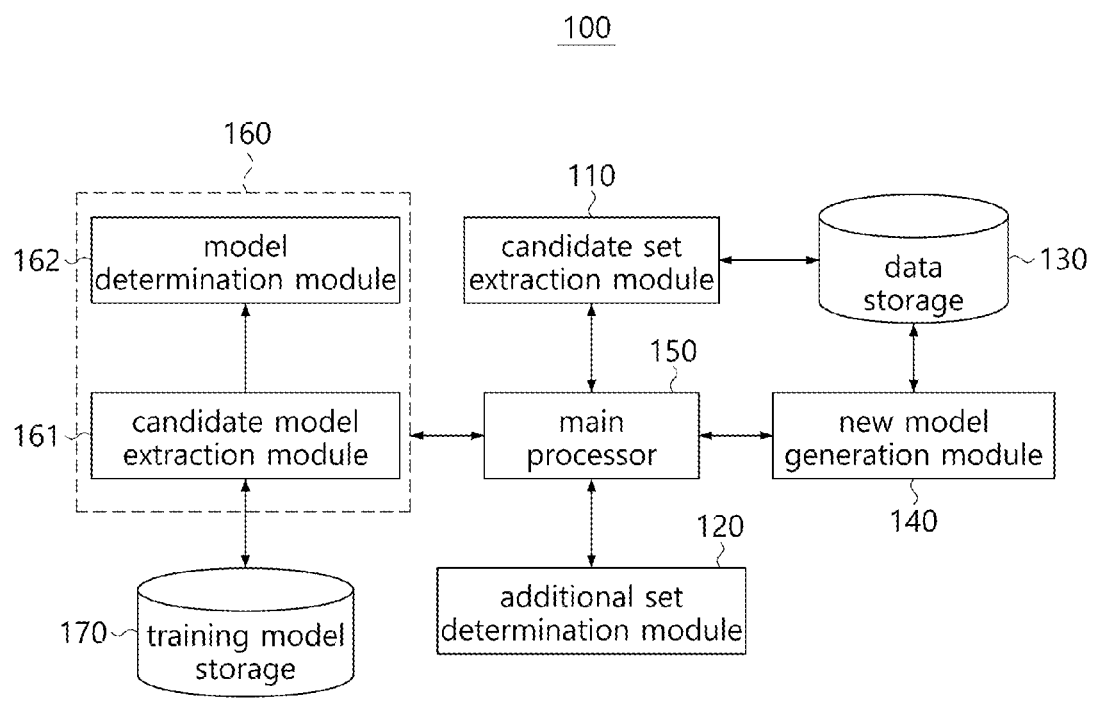
FIG. 2 is a view showing a configuration of an AI-based new learning model generation system according to an exemplary embodiment of the present disclosure.

FIG. 2 is a view showing a configuration of an AI-based new learning model generation system 100 according to the exemplary embodiment of the present disclosure. Describing with reference to FIG. 2, the AI-based new learning model generation system 100 according to the exemplary embodiment of the present disclosure includes a data storage 130, a candidate model extraction module 161, an additional set determination module 120, and a new model generation module 140. In addition, the AI-based new learning model generation system 100 according to the exemplary embodiment of the present disclosure may include a main processor 150 that controls operations of the data storage 130, the candidate model extraction module 161, the additional set determination module 120, and the new model generation module 140. Here, the main processor 150 includes a hardware configuration such as a CPU and RAM for operation of each component, and a software configuration such as an operating system.

The data storage 130 stores a plurality of training data sets and a plurality of new training data. In each of the training data sets, the training data applied to learning of the existing learning model previously generated for vision inspection on a product production line 300 is stored in correspondence with each learning model.

More specifically, when one existing learning model is generated through learning, the plurality of training data applied to the learning is stored as one training data set for a corresponding existing learning model. Describing with reference to FIG. 1, the product production line 300 includes processes of various vision inspection such as dent inspection, crack inspection, and scratch inspection, which are for inspecting defects of parts or products that are results of each process. In the product production line 300, learning models applied to each vision inspection process, for example, a learning model for dent inspection, a learning model for crack inspection, and a learning model for scratch inspection, are stored as a set for each model.

The plurality of new training data stored in the data storage 130 is collected for the generation of the new learning model to be generated by the AI-based new learning model generation system 100 according to the present disclosure. For example, when a product production line is changed for production of a new product in the existing product production line 300 or changed for setup of a new product production line 300, the training data, including a defective image and a normal image, and label information on whether the product is defective or normal, is collected for vision inspection of the new product or part.

Here, in the present disclosure, it is described that a plurality of training data sets and new training data are stored in the data storage 130, but it is apparent that the plurality of training data sets and new training data may be respectively distributed and stored in physically separated data storages 130, and such a configuration is included in the technical spirit of the present disclosure.

When determination type information for generating a new learning model is input, the candidate set extraction module 110 extracts at least two or more candidate data sets from among the plurality of training data sets on the basis of the determination type information.

The determination type information includes information on whether the new learning model is applied to vision inspection in which types of products or parts, and defects are inspected. The present disclosure provides an example in which the determination type information includes at least one piece of information among defect type information for the type of defects, product type information about the type of products to be inspected, and part type information about the type of parts to be inspected.

Correspondingly, each training data set stored in the data storage 130 may include model information having at least one piece of information among defect type information, product type information, and part type information. Here, when the determination type information is input, the candidate set extraction module 110 extracts candidate data sets from among the training data sets with reference to the model information of each training data set.

In the present disclosure, as an example, the candidate set extraction module 110 extracts a preset number of training data sets as candidate data sets according to a priority set in the order of defective type information, part type information, and product type information. For example, in a case of the input determination type information including: dent as the defect type information; a smartphone as the product type information; and a cover case as the part type information, the model extraction module 120 extracts a preset number of candidate data sets by a method in which a training data set corresponding to the dent is primarily extracted, and when the number of extracted training data sets is greater than or equal to a preset number, a training data set corresponding to the smartphone from among the extracted training data sets is secondarily extracted.

The additional set determination module 120 calculates similarity between a new training image included in the new training data and a candidate training image included in the candidate data sets. In addition, the additional set determination module 120 determines one candidate data set having similarity greater than or equal to a pre-registered reference value as an additional training data set.

The new model generation module 140 applies the training data, constituting the additional training data set determined by the additional set determination module 120, and the new training data to the pre-training model, and generates a new learning model through learning of the pre-training model.

According to the above configuration, in using the training data set applied to generate the previously registered existing learning model to generate a new learning model, a candidate data set is extracted by using the determination type information, and among the training data included in the candidate data set, a candidate data set having high similarity to new training data is determined as an additional training data set and used to generate the new learning model, whereby even when the new learning model having the small amount of training data is generated, the determination accuracy may be increased.

Hereinafter, the new learning model generation process of the AI-based new learning model generation system 100 according to the exemplary embodiment of the present disclosure will be described in detail with reference to FIGS. 3 and 4.

Figure 3:
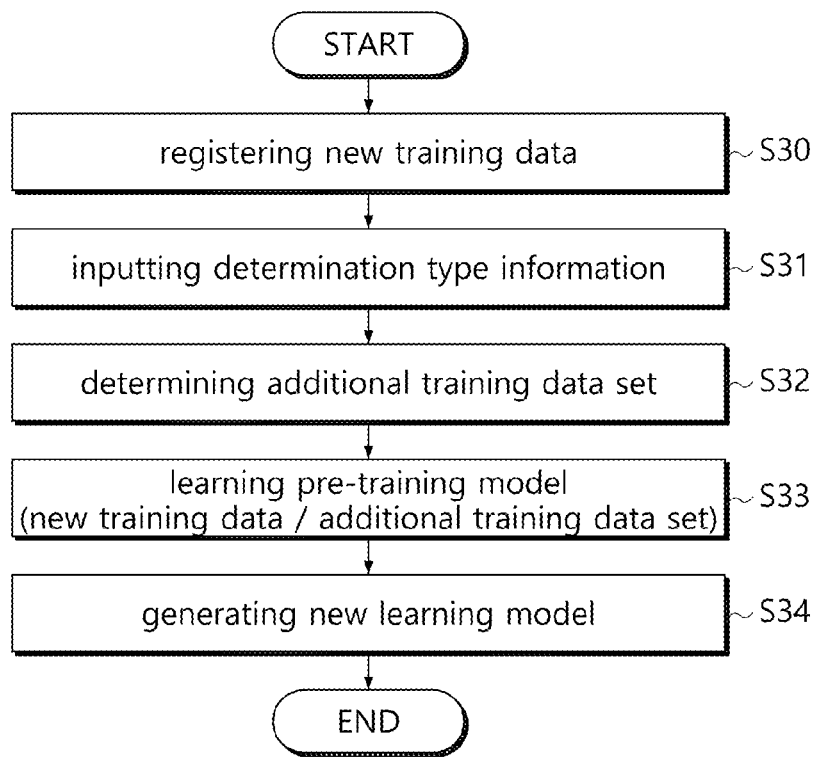
FIGS. 3 and 4 are views showing a new learning model generation process of the AI-based new learning model generation system according to the exemplary embodiment of the present disclosure.

Describing with reference to FIG. 3, in step S30, first, new training data for generating a new learning model is collected and registered. Next, in step S31, determination type information for generating the new learning model is input. Here, the determination type information may include at least one piece of information among defect type information, product type information, and part type information, as described above.

In step S31, when the determination type information is input, in step S32, the candidate set extraction module 110 performs a process of determining an additional training data set on the basis of the determination type information.

Figure 4:
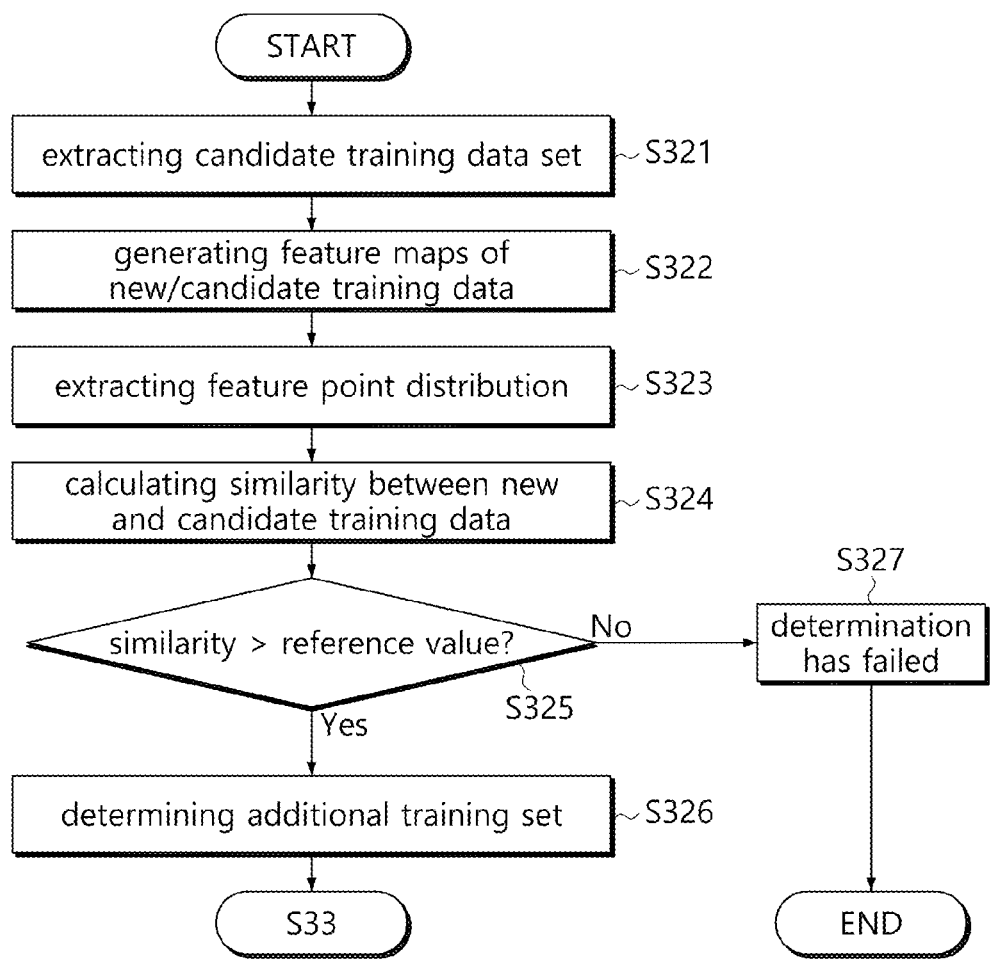

Describing with reference to FIG. 4, in step S321, the candidate set extraction module 110 refers to the model information of each training data set, stored in the data storage 130, according to the determination type information, and extracts a preset number of candidate data sets from among the plurality of training data sets.

Then, in step S322, the candidate set extraction module 110 generates feature maps for calculating similarity. The present disclosure provides an example in which the candidate set extraction module 110 generates new image feature maps from a preset number of new training images among the plurality of new training data, and generates candidate image feature maps from a preset number of candidate training images among the plurality of training data constituting the candidate data set.

In the present disclosure, a preset feature-map generation algorithm may be applied to generation of feature maps, and the feature maps may be generated through learning of the pre-training model, which will be described in detail later.

In this way, only a part of the candidate training images of the candidate data set and a part of the new training images of the new training data are used to apply to calculation of the similarity, whereby, in particular, the time required for the process of determining additional training data sets may be minimized.

In step S322, when new image feature maps and candidate image feature maps are generated, in step S323, new feature point distribution of each new image feature map is calculated, and candidate feature point distribution of each candidate image feature map is calculated.

Figure 5:
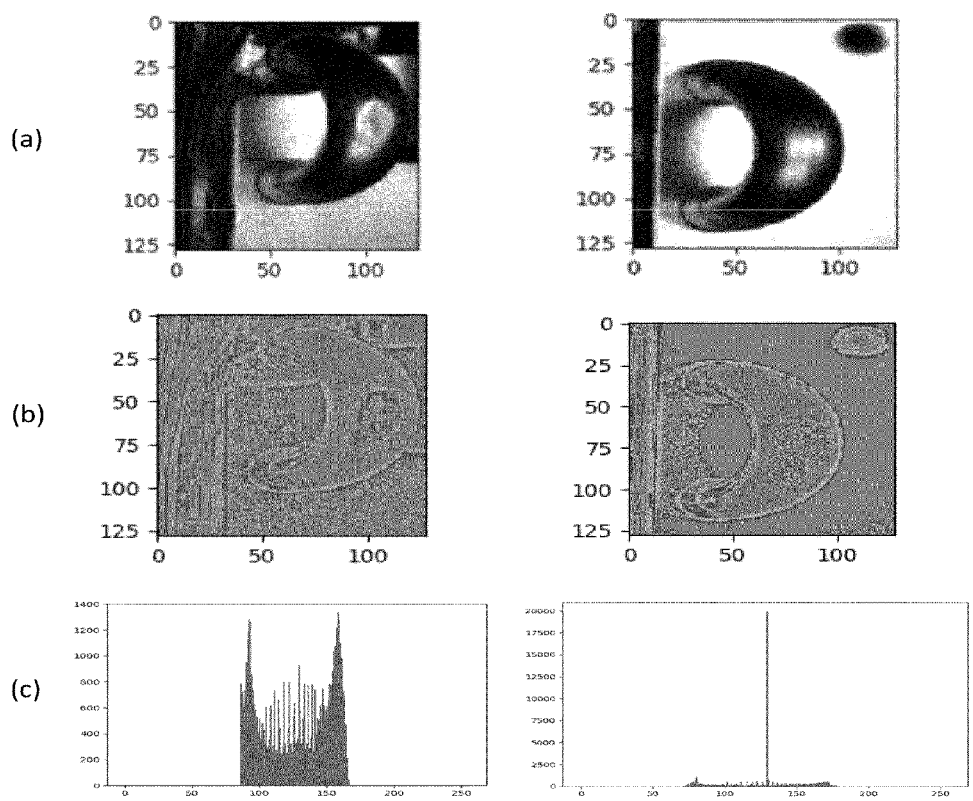
FIG. 5 is a view showing an example of feature maps and feature point distribution generated in a similarity calculation process in the AI-based new learning model generation system according to the exemplary embodiment of the present disclosure.

FIG. 5 is a view showing an example of feature maps and feature point distribution generated in a similarity calculation process in the AI-based new learning model generation system 100 according to the exemplary embodiment of the present disclosure. In FIG. 5, an image on the left of (a) is defective training data, and an image on the right of (a) is normal training data. An image on the left of (b) is feature maps for the defective training data, and an image on the right of (b) is feature maps for the normal training data. An image on the left of (c) is feature point distribution of the feature maps for the defective training data, and an image on the right of (c) is feature point distribution of the feature maps for the normal training data.

When comparing the similarity between the candidate training images of the candidate data set and the new training images of the new training data, the similarity between the defective training data is compared or the similarity between the normal training data is compared. For example, it is preferable to calculate the similarity between normal training data when images of normal products are similar, and compare similarity between defective training data when images of defective products are similar, so as to determine an additional training data set.

In the present disclosure, in step S324, a difference between the new feature point distribution and the candidate feature point distribution is calculated as similarity, and in the present disclosure, calculation through a KL-Divergence algorithm is exemplified.

In addition, in step S324, when similarity between each of the candidate data sets and the new training data is calculated, in step S326, the candidate set extraction module 110 determines one candidate data set having the similarity greater than or equal to a preset reference value as an additional training data set. Here, when there is a plurality of candidate data sets greater than or equal to the reference value, one candidate data set having the highest similarity may be determined as the additional training data set. Whereas, when there is no candidate data set having the similarity greater than or equal to a preset reference value, the candidate set extraction module 110 may terminate a determination process of the additional training data set, due to the failure in the determination in step S327.

According to the above configuration, in calculating the similarity between each candidate data set and the new training data, the feature point distribution of the feature maps generated during the learning process of an actual learning model is applied to the similarity comparison whereby there is provided an effect that images more similar to the new training data may be selected from the additional training data set to be applied when the new learning model is learned, and the determination accuracy of the new learning model may be increased.

When the additional training data set is determined through the above process, in step S33, the new model generation module 140 inputs the training data constituting the additional training data set and the new training data to a pre-training model, and trains the pre-training model. In addition, in step S34, a new learning model is finally generated through the learning of the pre-training model.

Referring back to the view shown in FIG. 2, the AI-based new learning model generation system 100 according to the exemplary embodiment of the present disclosure may further include a pre-training module determination module 160 and a training model storage 170.

A plurality of existing learning models for vision inspection on the product production line 300 is stored in the learning model storage. Here, the existing learning model stored in the learning model storage may be stored by matching each training data set stored in the data storage 130. That is, when the learning model for dent inspection of a specific part is stored in the learning model storage, training data applied when the learning model for the corresponding dent inspection is generated may be stored as a training data set. Here, corresponding to the training data set, the existing learning model may include model information having at least one piece of information among defect type information, part type information, and product type information, which will be described in detail later.

The pre-training module determination module 160 determines one of the existing learning models stored in the training model storage 170 as a pre-training model to be applied in the new model generation module 140 and the additional set determination module 120. In the present disclosure, it is exemplified that the pre-training module determination module 160 includes a candidate model extraction module 161 and a model determination module 162.

The candidate model extraction module 161 extracts at least two candidate models from among a plurality of existing training data on the basis of the determination type information. In addition, in the model determination module 162, each candidate model inputs a preset amount of new training data among the new training data stored in the data storage 130 to determine whether the new training data is good or not, and the model determination module 162 determines, as a pre-training model, an uppermost candidate model having determination accuracy of each candidate model greater than or equal to a preset first reference value.

More specifically, the plurality of training data is collected to generate a new learning model, and when determination type information, for example, defect type information is input, the candidate model extraction module 161 searches for the existing learning model that was generated to inspect the defect type same as that in the defect type information among the existing learning models stored in the learning model storage, and extracts the existing learning model as a candidate model.

Here, as described above, on the basis of the registered model information for each existing learning model, the candidate model extraction module 161 may extract, as the candidate model, a preset number of existing learning models according to a priority set in the order of defective type information, part type information, and product type information.

Through the above process, the existing learning model that has inspected the most similar type of defects to the new learning model among the plurality of existing learning models stored in the learning model storage may be extracted as the candidate model, whereby the determination accuracy of the new learning model generated by using the pre-training model finally selected in the subsequent process may be increased.

The model determination module 162 extracts a preset amount of training data from among the training data stored in the data storage 130. For example, in a case of assuming that 1,000 new training images are stored as new training data, when all 1,000 pieces of new training data are used to calculate determination accuracy, it takes a lot of time to determine a pre-training model. Therefore, by extracting 200 new training images of a preset number, for example, 20% of the 1,000 new training images, and using the images to calculate the determination accuracy, the time required to determine the pre-training model may be reduced.

The model determination module 162 inputs the 200 pieces of new training data to each candidate model to determine whether the new training data is good or not, and calculates the determination accuracy on the basis of label information of each new training data. In addition, the model determination module 162 determines, as a pre-training model for generating a new learning model, an uppermost candidate model from among the candidate models having the determination accuracy greater than or equal to a first reference value among each of the candidate models. In the present disclosure, it is exemplified that the first reference value is set to 80%, but it is apparent that the technical spirit of the present disclosure is not limited thereto.

Through the process as described above, the learning model most similar to the new learning model among the existing learning models applied to various product production lines 300 may be extracted as the candidate model, and the extracted candidate model is allowed to determine whether the training data is good or not, so that the uppermost candidate model among the candidate models whose determination accuracy is greater than or equal to the first reference value is recommended as the pre-training model, whereby there is provided an effect that the determination accuracy of the new learning model to be generated later may be increased.

In addition, the pre-training model is determined by using only a predetermined amount of training data without using all of the collected training data, thereby significantly reducing the required time.

Hereinafter, another example of the new learning model generation process of the AI-based new learning model generation system 100 according to the exemplary embodiment of the present disclosure will be described in detail with reference to FIGS. 6 to 11. In the exemplary embodiment shown in FIGS. 6 to 11, a pre-training model is determined by the pre-training module determination module 160, and the pre-training model determined in this way is applied to a determination process of an additional training data set and a generation process of a new learning model.

Figure 6:
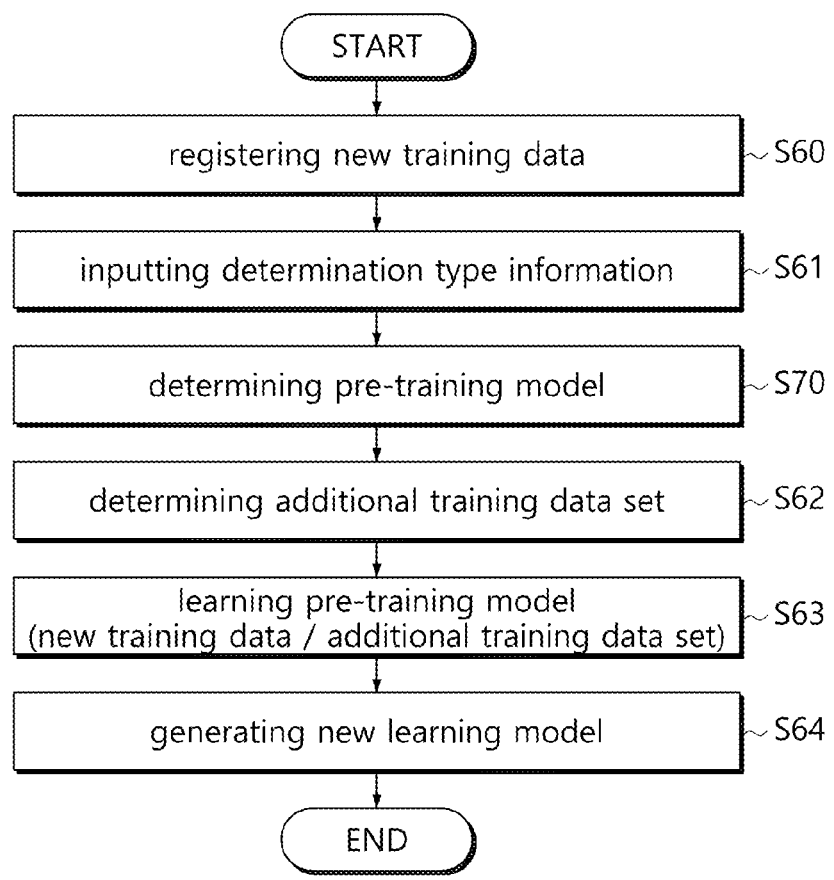
FIGS. 6 to 11 are views showing another example of the new learning model generation process of the AI-based new learning model generation system according to the exemplary embodiment of the present disclosure.

In describing the exemplary embodiment shown in FIG. 6, a detailed description of the configuration corresponding to the exemplary embodiment shown in FIG. 3 may be omitted, and the description of the exemplary embodiment shown in FIG. 3 may be substituted instead.

Describing with reference to FIG. 6, in step S60, when new training data is collected and registered, and in S61 the determination type information is input, in step S70, a process of determining a pre-training model is performed. Here, steps S60 and S61 respectively correspond to steps S30 and S31 shown in FIG. 3, and a detailed description thereof will be omitted.

Figure 7:
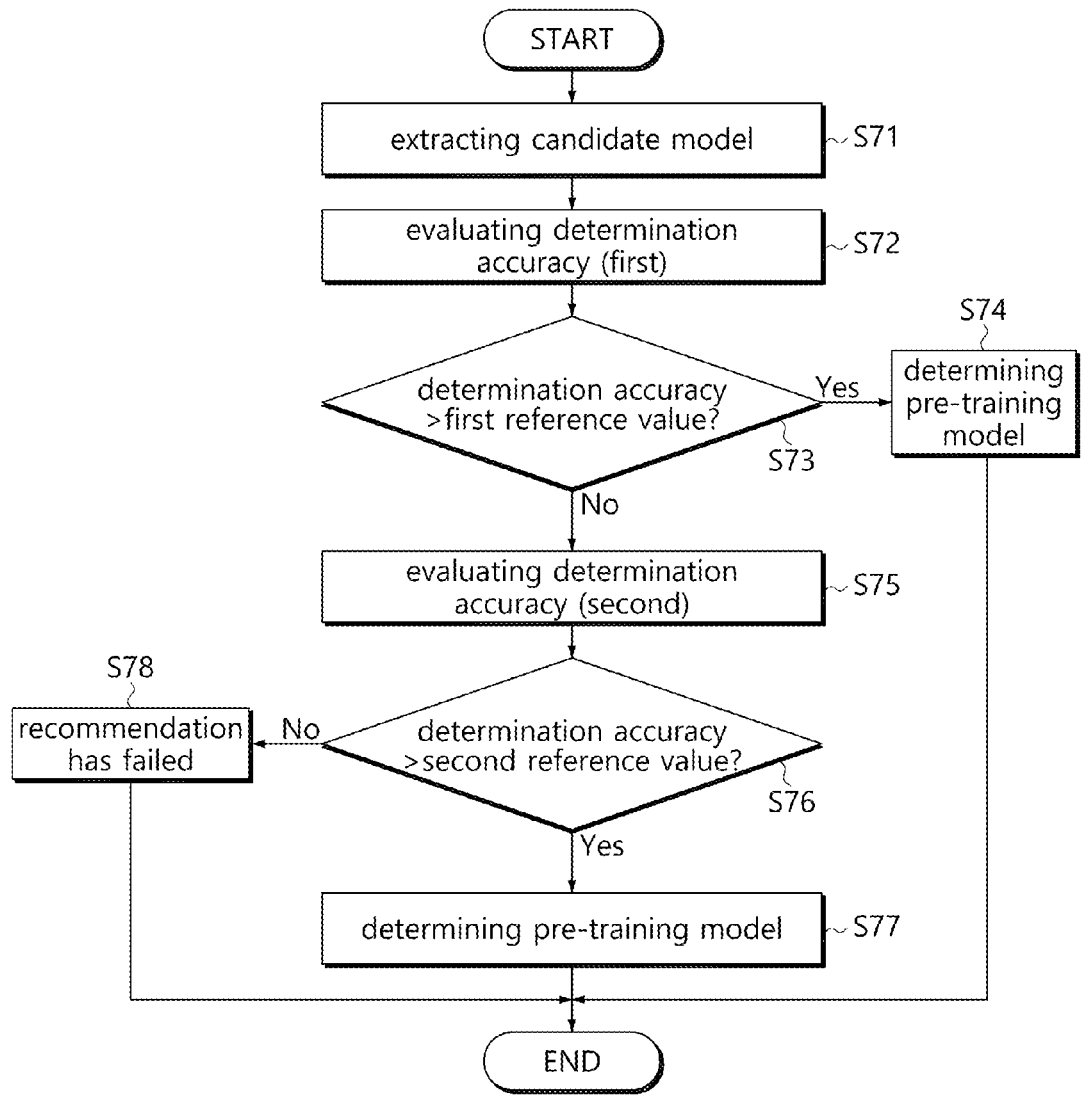
Figure 8:
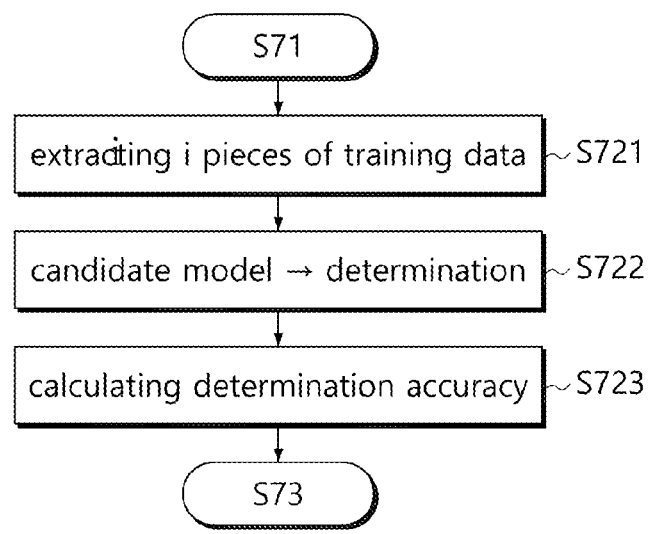
Figure 9:
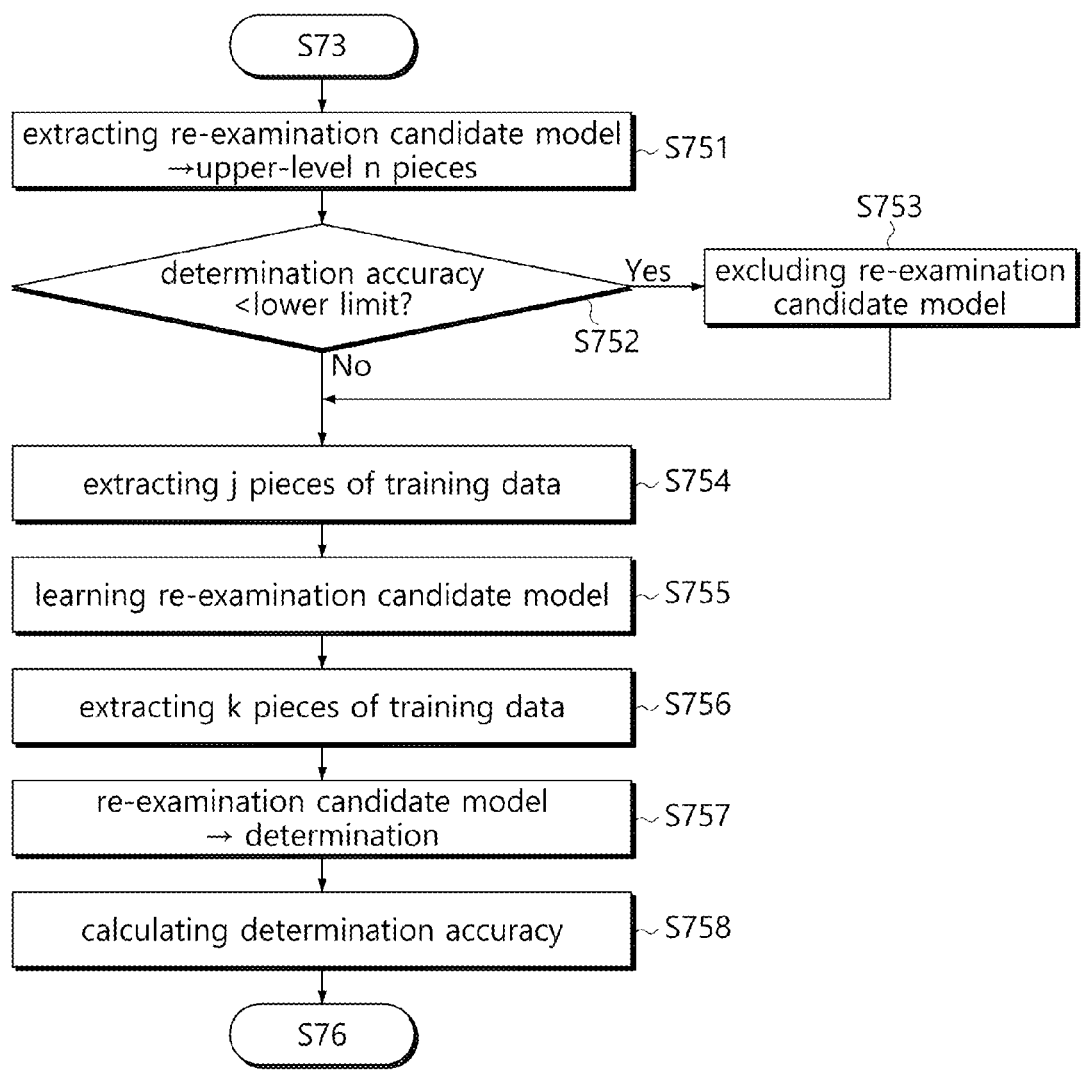

FIGS. 7 to 9 are views showing an example of a process of determining a pre-training model in the AI-based new learning model generation system 100 according to the exemplary embodiment of the present disclosure.

Describing with reference to FIG. 7, in step S71, the candidate model extraction module 161 extracts a candidate model with reference to model information of an existing learning model, stored in the learning model storage, on the basis of the determination type information input in step S61. Here, the method in which the candidate model extraction module 161 extracts a preset number of candidate models from the existing training data is as described above.

In step S72, when the candidate model is extracted, the model determination module 162 performs a determination accuracy evaluation process for each candidate model. FIG. 8 is a view showing a first determination accuracy evaluation process performed by the model determination module 162.

In step S721, the model determination module 162 extracts a preset number i pieces of new training data from among the new training data stored in the data storage 130. Next, in step S722, the model determination module 162 causes each candidate model to determine whether the extracted i pieces of training data is good or not, and in step S723, the determination accuracy of each candidate model is calculated on the basis of the determination result and label information of each new training data.

Describing with reference to FIG. 7 again, in step S73, it is determined whether the determination accuracy of each candidate model is greater than or equal to the first reference value, and in step S74, an uppermost candidate model among the candidate models whose determination accuracy is greater than or equal to the first reference value is determined as a pre-training model.

Meanwhile, when the determination accuracy of all candidate models is less than or equal to the first reference value in step S73, in step S75, the model determination module 162 performs a second determination accuracy evaluation process. FIG. 9 is a view showing a secondary determination accuracy evaluation process performed by the model determination modules 162 and 130.

Describing with reference to FIG. 9, in step S751, the model determination module 162 extracts the upper-level n candidate models as re-examination candidate models on the basis of the determination accuracy calculated in step S72. For example, in a state where 10 candidate models are extracted, when all 10 candidate models show determination accuracy of 80% or less, the upper-level 5 candidate models are extracted as re-examination candidate models.

Here, in step S752, when extracting upper-level n re-examination candidate modules, it is determined whether a candidate model whose determination accuracy of the n re-examination candidate models is less than or equal to a preset lower limit is present, and in step S753, a candidate model having determination accuracy less than or equal to the lower limit is excluded from the re-examination candidate model. For example, assuming that the lower limit is set to 60%, when the determination accuracy of two of the five re-examination candidate models is 60% or less, only three candidate models may be extracted as the re-examination candidate models.

In this way, the candidate models whose determination accuracy is smaller than the lower limit are excluded from the secondary determination accuracy evaluation process so that the time required for the secondary determination accuracy evaluation process is reduced, and a candidate model that is less likely to be determined as a pre-training model is excluded in advance, thereby increasing the efficiency of the model determination process.

When the re-examination candidate model is extracted through the above process, in step S754, the model determination module 162 extracts a preset number j pieces of training data from the data storage 130. Next, in step S755, the model determination module 162 trains each re-examination candidate model with the extracted j pieces of new training data.

When the learning of the re-examination candidate model is completed, in step S756, the model determination module 162 extracts a preset number k pieces of new training data from the data storage 130, in step S757, each re-examination candidate model that has completed learning is allowed to determine whether the extracted k pieces of new training data is good or not, and in step S758, the determination accuracy of each re-examination candidate model is calculated on the basis of the determination result and the label information of each new training data.

Through the above process, in step S72, that is, in the first determination accuracy evaluation process, the candidate models having the determination accuracy less than or equal to the first reference value are trained by using a part of the new training data for generation of an actual new learning model, and then the determination accuracy is re-evaluated, thereby improving the possibility that the existing learning model appropriate for new training data is extracted as the pre-training model.

Describing with reference to FIG. 7 again, when the determination accuracy of a re-examination candidate model is calculated through the secondary determination accuracy evaluation process, in step S76, it is determined whether the determination accuracy of each re-examination candidate model is greater than or equal to a second reference value, and in step S77, an uppermost re-examination candidate model among re-examination candidate models whose determination accuracy is greater than or equal to a second reference value is determined as a pre-training model. Whereas, when there is no re-examination candidate model having the determination accuracy greater than or equal to the second reference value, in step S78, it may be determined that recommendation has failed.

Here, the second reference value may be set relatively higher than the first reference value. For example, as described above, when the first reference value is set to 80%, the second reference value may be set to 90%. The second reference value reflects the fact that the re-examination candidate model to which the second reference value is applied may be trained with the new training data to be applied when the actual new learning model is generated so that the determination accuracy of the new training data may be increased.

Through the same process as above, the pre-training model is primarily determined from the candidate model having high determination accuracy, and the secondary determination process is added, wherein the upper-level n candidate models are trained by using new training data when the determination accuracy is lower than the first reference value, and then the determination accuracy is calculated, whereby the existing learning model closest to the new learning model may be determined as the pre-training model.

Figure 10:
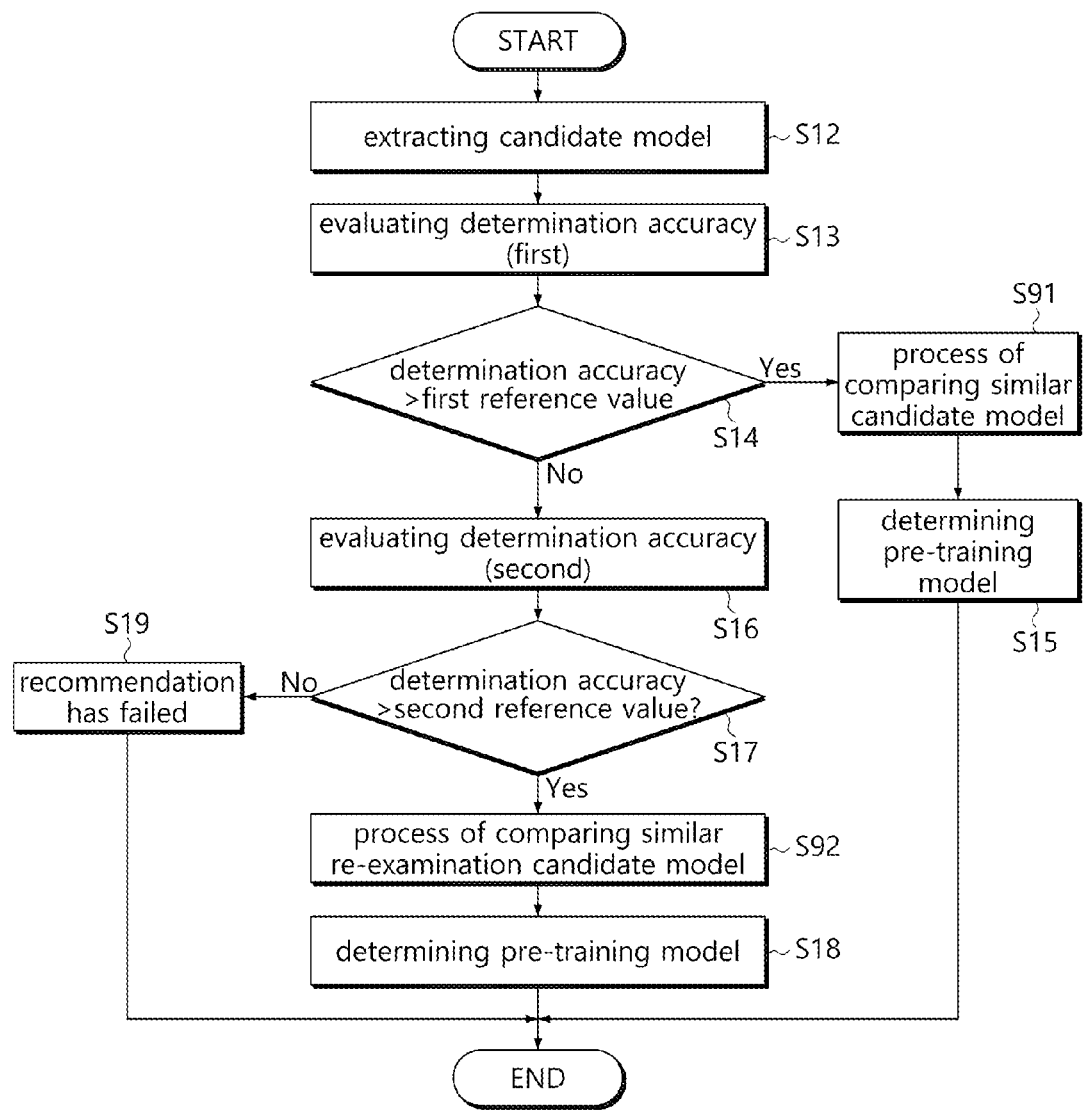
Figure 11:
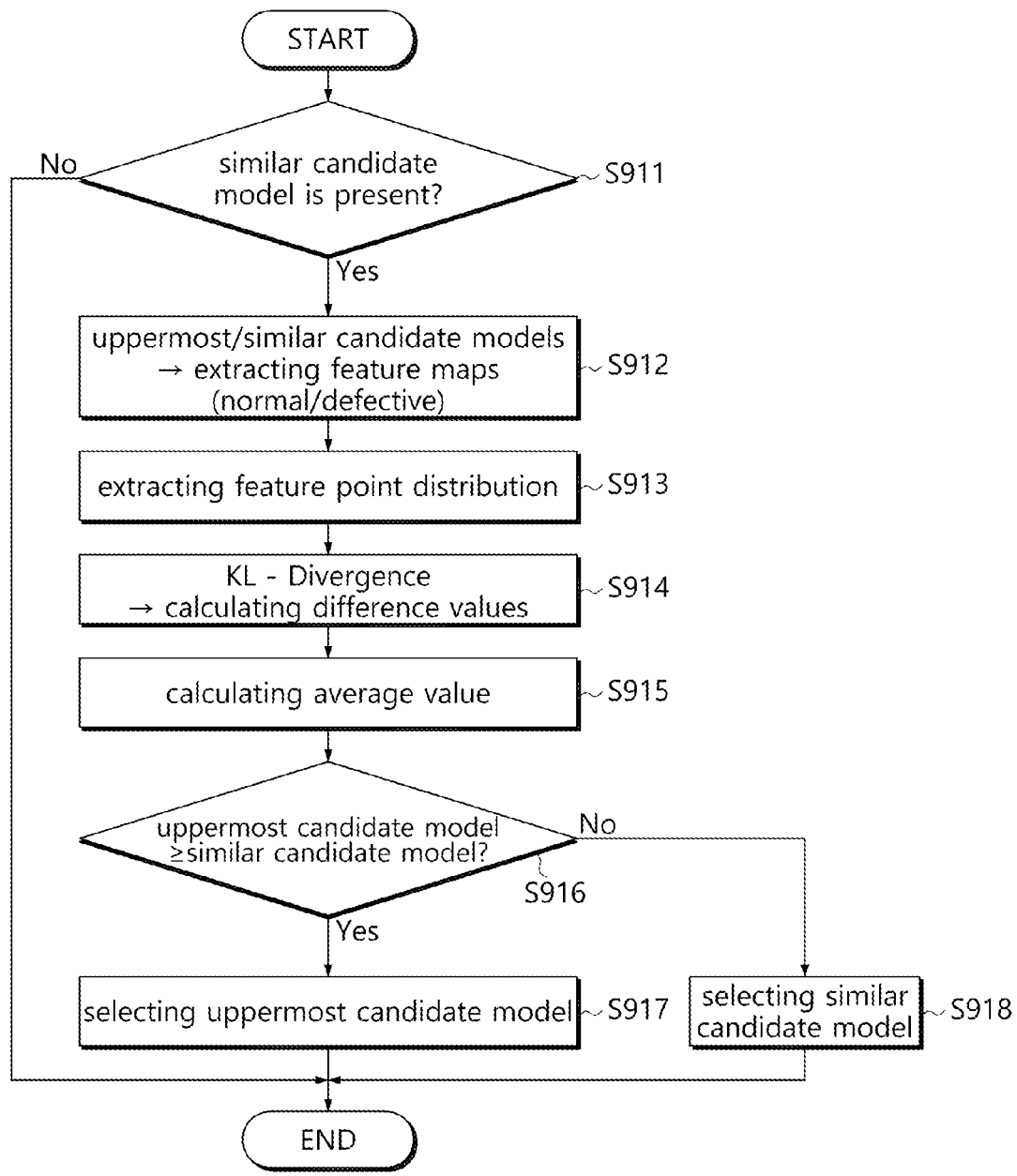

FIGS. 10 and 11 are views showing another example of a process of determining a pre-training model in the AI-based new learning model generation system 100 according to the exemplary embodiment of the present disclosure. The exemplary embodiment shown in FIGS. 10 and 11 is a modified example of the exemplary embodiment shown in FIGS. 7 to 9, and a description thereof may be omitted for the components that correspond to each other.

When determination type information is input (refer to S61 in FIG. 6), in step S12, the candidate model extraction module 161 extracts the candidate model with reference to the model information of the existing learning model, stored in the learning model storage, on the basis of the determination type information. A candidate model extraction method performed by the candidate model extraction module 161 is as described above.

When the candidate model is extracted, in step S13, the model determination module 162 performs the first determination accuracy evaluation process for each candidate model. Here, since the determination accuracy evaluation process by the model determination module 162 corresponds to the exemplary embodiment shown in FIG. 8, a description thereof will be omitted.

When the determination accuracy for each candidate model is calculated through the first determination accuracy evaluation process, in step S14, it is determined whether the determination accuracy of each candidate model is greater than or equal to the first reference value. In this case, when there is a similar candidate model whose determination accuracy difference from the uppermost candidate model having determination accuracy greater than or equal to the first reference value is within a preset similarity range, in step S91, a comparison process of the similar candidate models is performed.

Describing in more detail with reference to FIG. 11, in step S911, when the similar candidate model whose determination accuracy difference from the uppermost candidate model is within the similarity range, in step S912, feature maps of the uppermost candidate model and the similar candidate model are extracted. In addition, in step S913, the feature point distribution of the feature maps is extracted.

In order to calculate the determination accuracy of the uppermost candidate model and similar candidate model, the feature maps are generated for each training data in a process in which the corresponding candidate model determines training data on the basis of deep learning. In addition, the feature point distribution that is probability distribution may be extracted from the feature maps. Here, the feature maps and feature point distribution are extracted for normal training data and defective training data among the training data. Examples of feature maps and feature point distribution for normal learning data and defective learning data are shown in FIG. 5.

As shown in (c) of FIG. 8, the feature point distribution between the defective training data and the normal training data shows a difference, and increase in the difference between two feature point distributions may be evaluated as the fact that the learning model extracts the feature maps distinguishably well from an original image, and thus, as a result, the determination accuracy of the final learning model may be increased.

When a similarity range for determination accuracy is set to 2%, the determination accuracy of the uppermost candidate model is calculated to be 85%, and when determination accuracy of the candidate model of a subsequent rank is calculated as 83%, the corresponding candidate model is extracted as a similar candidate model, so the determination accuracy may vary depending on a sampling process of the extracted new training data for calculating the determination accuracy and the amount of the new training data. Accordingly, since there is a case in which it is not possible to determine which learning model is optimal among the uppermost candidate model and the similar candidate model within the similarity range, an optimal pre-training model is determined by using the feature point distribution.

In the present disclosure, as an example, in step S914, among the uppermost learning model and the similar candidate model, the difference between the feature point distribution of the defective training data and the feature point distribution of the normal training data is calculated, and any one model having a large difference is determined as the pre-training model. In this case, in step S914, an arbitrarily preset amount of defective training data and normal training data are extracted from among the plurality of new training data applied to the determination process of the uppermost candidate model and the similar candidate model, and each difference value of feature point distribution between the defective training data and the normal learning data is calculated, and then, in step S915, an average value is calculated. In addition, in step S916, an average value of the uppermost candidate model is compared with an average value of the similar candidate model. When the average value of the uppermost candidate model is large, in step S917, the uppermost candidate model is selected, and when the average value of the similar candidate models is large, in step S918, the similar candidate model is selected, whereby the uppermost candidate model is determined as a pre-training model (refer to S15 in FIG. 10).

Here, an algorithm capable of calculating a difference in probability distribution may be applied to the calculation of a difference value of feature point distribution, and in the present disclosure, it is exemplified that the difference value is calculated through the KL-Divergence algorithm.

Describing with reference to FIG. 10 again, in step S14, when the determination accuracy of all candidate models is less than or equal to the first reference value, in step S16, the model determination module 162 performs the secondary determination accuracy evaluation process. Here, since the secondary determination accuracy evaluation process corresponds to the exemplary embodiment shown in FIG. 9, a detailed description thereof will be omitted.

When the determination accuracy of each re-examination candidate model is calculated through the secondary determination accuracy evaluation process, in step S17, whether the determination accuracy of each re-examination candidate model is greater than or equal to the second reference value is determined. In this case, when there is a similar re-examination candidate model whose determination accuracy difference from the uppermost re-examination candidate model having determination accuracy greater than or equal to the second reference value is within a preset similarity range, in step S92, a comparison process of the similar re-examination candidate models is performed.

Here, the comparison process of the similar re-examination candidate models corresponds to the comparison process of the similar candidate models shown in FIG. 11. More specifically, when there is a similar re-examination candidate model whose determination accuracy difference from the uppermost re-examination candidate model is within a similarity range (refer to S911), feature maps of the uppermost re-examination candidate model and the similar re-examination candidate model are extracted (refer to S912). In addition, feature point distribution of the feature maps is extracted (refer to S913).

In this case, as described above, after calculating the difference value of the feature point distribution between the defective training data and the normal training data (refer to S914), an average value is calculated (refer to S915). In addition, by comparing the average value of the uppermost re-examination candidate model with the average value of the similar re-examination candidate model (refer to S916), when the average value of the uppermost re-examination candidate model is large, the uppermost re-examination candidate model is selected (refer to S917), and when the average value of the similar re-examination candidate model is large, the similar re-examination candidate model is selected (refer to S918), whereby a pre-trained model is determined in step S18.

As above, even in the case where the uppermost candidate model or the uppermost re-examination candidate model is present, when there is the similar candidate model or the similar re-examination candidate model whose determination accuracy is within the similarity range, a final pre-training model is determined by using the feature point distribution of the feature maps so that the learning model that is closer to the new learning model may be determined as the pre-training model.

Describing with reference to FIG. 6 again, when the pre-training model is determined through the above process, in step S62, the process of determining an additional training data set is performed. Here, the process of determining the additional training data set is the same as the process in the exemplary embodiment shown in FIG. 4, and in the exemplary embodiment shown in FIG. 4, the pre-training model determined in step S70 shown in FIG. 6 is applied in the process of generating feature maps of the candidate training data set and the new training data. That is, the pre-training model extracted as most appropriate for the generation of the new learning model is applied to generation of the feature maps in the process of determining the training data set to be added for the generation of the new learning model, so that the training data set most similar to the new training data may be determined.

In addition, when the additional training data set is determined, a new learning model is generated by using the pre-training model determined in step S70 of FIG. 6, and as described above, the new training data and the training data constituting the additional training data set are trained through the pre-training model, whereby it is possible to solve the problem in which the determination accuracy decrease occurs when learning using a small amount of new training data.

Although the exemplary embodiments of the present disclosure have been described above with reference to the accompanying drawings, it will be understood that those skilled in the art to which the present disclosure pertains may implement the present disclosure in other specific forms without departing from the technical spirit or essential features thereof. Therefore, it should be understood that the above-described exemplary embodiments are illustrative in all respects and not restrictive.

DESCRIPTION OF THE REFERENCE NUMERALS IN THE DRAWINGS

100: AI-based new learning model generation system

110: candidate set extraction module 120: additional set determination module
130: data storage 140: new model generation module
150: main processor 160: pre-training model determination module
161: candidate model extraction module 162: model determination module
170: training model storage 300: product production line

INDUSTRIAL APPLICABILITY

The present disclosure is applicable to the field of vision inspection of a result of each production process of a product production line.

The invention claimed is:

1. An AI-based new learning model generation system for vision inspection on a product production line, the AI-based new learning model generation system comprising:
a data storage in which a plurality of training data sets and a plurality of new training data collected for generation of a new learning model are stored, wherein each of the training data sets is applied to learning of existing learning models previously generated for the vision inspection on the product production line;
a candidate set extraction module configured to extract at least two or more candidate data sets from among the plurality of training data sets on the basis of determination type information when the determination type information for generating the new learning model is input;
an additional set determination module configured to calculate similarity between new training image included in the new training data and a candidate training image included in the candidate data sets and determine, as an additional training data set, one candidate data set having the similarity greater than or equal to a pre-registered reference value; and
a new model generation module configured to generate the new learning model by applying the new training data and the additional training data set determined by the additional set determination module to a pre-training model.

2. The AI-based new learning model generation system of claim 1, wherein the determination type information comprises at least one piece of information among defect type information on a type of defects, product type information on a type of products to be inspected, and part type information on a type of parts to be inspected,
each of the training data sets stored in the data storage comprises model information having at least one piece of information among the defect type information, the product type information, and the part type information, and
the candidate set extraction module extracts the candidate data sets with reference to the model information.

3. The AI-based new learning model generation system of claim 2, wherein the candidate set extraction module extracts a preset number of training data sets as the candidate data sets according to a priority set in an order of the defect type information, the part type information, and the product type information.

4. The AI-based new learning model generation system of claim 1, wherein the additional set determination module generates new image feature maps from a preset number of new training images among the plurality of new training data, calculates new feature point distribution of each of the new image feature maps, generates candidate image feature maps from a preset number of candidate training images among the candidate data sets, calculates candidate feature point distribution of each of the candidate image feature maps, and calculates a difference between the new feature point distribution and the candidate feature point distribution as the similarity.

5. The AI-based new learning model generation system of claim 4, wherein the difference between the new feature point distribution and the candidate feature point distribution is calculated through a KL-Divergence algorithm.

6. The AI-based new learning model generation system of claim 4, wherein the preset number of the new training images and the preset number of the candidate training images are respectively trained through the pre-training model so that the new image feature maps and the candidate image feature maps are generated.

7. The AI-based new learning model generation system of claim 6, further comprising:
a learning model storage in which a plurality of existing learning models is stored;
a candidate model extraction module configured to extract at least two candidate models from among the plurality of existing learning models on the basis of the determination type information; and
a model determination module configured to input a preset amount of new training data among the new training data stored in the data storage into each of the candidate models to determine whether the new training data is good or not, and determine, as the pre-training model, an uppermost candidate model in which determination accuracy of a plurality of candidate models is greater than or equal to a preset first reference value.

8. The AI-based new learning model generation system of claim 7, wherein the model determination module extracts feature point distribution of feature maps generated for the new training data in a determination process of the uppermost candidate model and a similar candidate model when there is the similar candidate model whose determination accuracy difference from the uppermost candidate model among the plurality of candidate models is within a preset similarity range, and determines, as the pre-training model, any one candidate model whose feature point distribution difference between defective training data and normal training data is large among the uppermost candidate model and the similar candidate model.

9. The AI-based new learning model generation system of claim 8, wherein the model determination module calculates an average value of the feature point distribution difference between a preset amount of defective training data and the normal training data, which are arbitrarily selected from among the plurality of training data applied to the determination process of the uppermost candidate model and the similar candidate model, and determines, as the pre-training model, any one candidate model having a larger average value among the uppermost candidate model and the similar candidate model.

10. The AI-based new learning model generation system of claim 8, wherein the feature point distribution difference is calculated through the KL-Divergence algorithm.

11. The AI-based new learning model generation system of claim 7, wherein the model determination module extracts upper-level n candidate models, based on the determination accuracy, as re-examination candidate models when the determination accuracy of the plurality of candidate models is less than or equal to the first reference value, trains each of the re-examination candidate models with a preset amount of training data among the plurality of training data, inputs the preset amount of training data among the plurality of the training data into the trained re-examination candidate models to determine whether the training data is good or not, and determines, as the pre-training model, an uppermost re-examination candidate model in which the determination accuracy of each re-examination candidate model is greater than or equal to a preset second reference value.

12. The AI-based new learning model generation system of claim 11, wherein, when extracting the re-examination candidate models, the model determination module removes the candidate models, whose determination accuracy is less than or equal to a preset lower limit, from the re-examination candidate models.

13. The AI-based new learning model generation system of claim 11, wherein the model determination module extracts feature point distribution of the feature maps generated for each of the training data in the determination process of the uppermost re-examination candidate model and a similar re-examination candidate model when there is the similar re-examination candidate model whose determination accuracy difference from the uppermost re-examination candidate model among the plurality of re-examination candidate models is within a preset similarity range, and determines, as the pre-training model, any one candidate model whose feature point distribution difference between defective training data and normal training data is large among the uppermost re-examination candidate model and the similar re-examination candidate model.

14. The AI-based new learning model generation system of claim 13, wherein the model determination module calculates an average value of the feature point distribution difference between the normal training data and a preset amount of defective training data arbitrarily selected from among the plurality of training data applied to the determination process of the uppermost re-examination candidate model and the similar re-examination candidate model, and determines, as the pre-training model, any one candidate model having a larger average value among the uppermost re-examination candidate model and the similar retest candidate model.

15. The AI-based new learning model generation system of claim 13, wherein the feature point distribution difference is calculated through the KL-Divergence algorithm.

* * * * *